No. 622,866. Patented Apr. 11, 1899.
C. F. SCOTT.
SYSTEM OF ELECTRICAL DISTRIBUTION.
(Application filed Nov. 4, 1898.)
(No Model.)
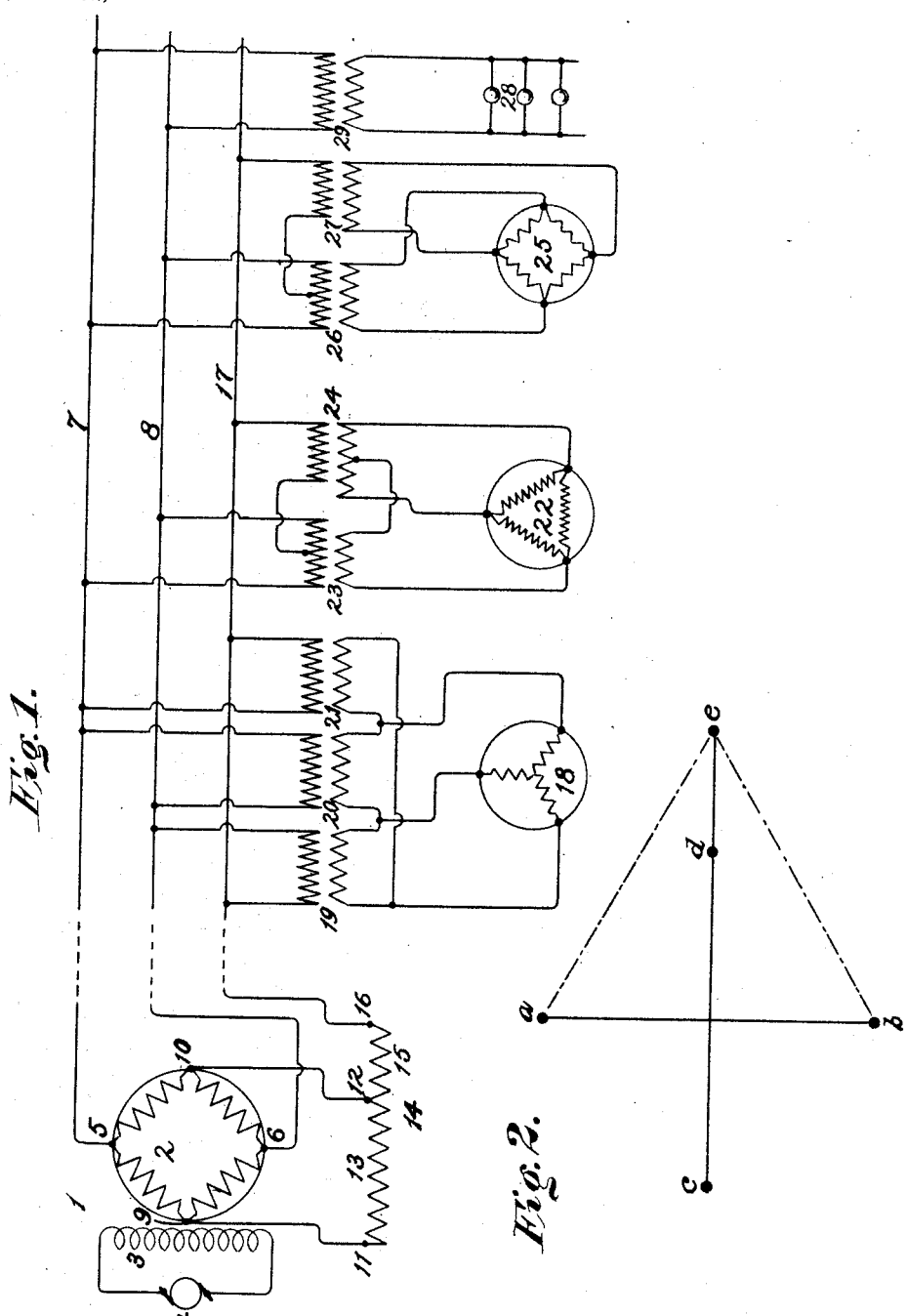
WITNESSES:
INVENTOR
Charles F. Scott
BY
ATTORNEY.

UNITED STATES PATENT OFFICE.

CHARLES F. SCOTT, OF PITTSBURG, PENNSYLVANIA, ASSIGNOR TO THE WESTINGHOUSE ELECTRIC AND MANUFACTURING COMPANY, OF PENNSYLVANIA.

SYSTEM OF ELECTRICAL DISTRIBUTION.

SPECIFICATION forming part of Letters Patent No. 622,866, dated April 11, 1899.

Application filed November 4, 1898. Serial No. 695,499. (No model.)

*To all whom it may concern:*

Be it known that I, CHARLES F. SCOTT, a citizen of the United States, residing in Pittsburg, in the county of Allegheny and State of Pennsylvania, have invented a new and useful Improvement in Systems of Electrical Distribution, (Case No. 795,) of which the following is a specification.

My invention relates to systems of distribution for alternating currents; and it has for its object to provide a simple, economical, and efficient system whereby a source of polyphase electromotive forces and currents may be satisfactorily utilized for operating both single-phase and polyphase translating devices.

It sometimes occurs that where two-phase generators are installed and in use for power purposes it is desirable to employ one of the circuits from the generator for the purpose of operating single-phase translating devices—such, for example, as electric lights. So far as this use is concerned, therefore, if only one of the phases is employed the machine is, in effect, a single-phase generator.

It has been demonstrated and is now well known in the art that the distribution of current for power purposes over considerable distances is rendered most efficient by the use of three wires carrying three phases of current.

The chief object of my present invention is to utilize a two-phase generator for distributing energy over a three-phase circuit and to operate lights or other single-phase translating devices from two of the conductors of the distributing system and two-phase or three-phase motors from the three conductors of the system. In order to effect these results, I propose to employ the apparatus and circuits illustrated in the accompanying drawings, in which—

Figure 1 is a diagram of a two-phase generator and three-phase transmitting and distributing circuits supplied therefrom and in turn supplying single-phase, two-phase, and three-phase translating devices. Fig. 2 is a diagram of the generator and distributing-circuit electromotive forces.

Referring particularly to Fig. 1 of the drawings, 1 is a two-phase generator having a closed-coil armature-winding 2, the field-magnet winding 3 being energized by a suitable exciter 4. Two terminals 5 and 6 of the armature-winding of the generator corresponding to one phase of current are connected, respectively, to the line conductors 7 and 8, and two terminals 9 and 10, taking a current having a phase-angle difference of ninety degrees from the first-named current, are connected, respectively, to the terminals 11 and 12 of the winding 13 of a transformer 14. The secondary winding 15 of the transformer 14 is connected to the terminal 12 of the primary and therefore to the terminal 10 of the generator-armature, and the other terminal 16 of the secondary 15 is connected to the third line conductor 17 of the system. The transformer 14 is so proportioned that the electromotive force generated by the secondary winding is that necessary for producing a proper three-phase relation in the three line conductors. This relation will be preferably such that the currents of the three phases will differ from each other by an angle of approximately one hundred and twenty degrees. In order to secure such relation, it will be readily understood that the secondary electromotive force of the transformer will be approximately 36.7 per cent. of the normal electromotive force of the two-phase machine and also of the three-phase circuit.

I have shown four varieties of translating devices supplied from the line-circuits, the first being a three-phase motor 18, having a star-connected primary winding supplied from three transformers 19, 20, and 21, the secondary windings of which are of the same length and suitably connected for the three-phase relation desired. The three primary windings are connected across the line conductors so as to receive three-phase currents therefrom.

The three-phase motor 22 is provided with a primary winding having a delta connection and supplied by two transformers 23 and 24, the primary and secondary windings of which are respectively proportioned and connected as shown in Fig. 3 of my Patent No. 521,051, granted June 5, 1894.

The two-phase motor 25 is shown as having an interconnected primary winding and as supplied from two transformers 26 and 27, the primaries of which are proportioned and connected together and to the three-phase circuit substantially as shown in Fig. 2 of my patent above referred to.

It will be readily understood that the primary winding of the motor 25 might comprise two independent circuits for the two phases of current instead of being interconnected to form a closed-coil winding, as shown.

The single-phase translating devices—such, for example, as lamps—(indicated at 28) are supplied from the secondary of a transformer 29, the primary of which is connected across the circuit 7 8. Single-phase translating devices might also be supplied from the circuits 8 17 and 7 17, if desired.

It will be readily understood without further illustration or description that the several translating devices employed might be connected directly across the main circuits without interposition of transformers provided the line-voltage were suitable for the operation of such devices.

It will also be readily understood that both single-phase and polyphase translating devices may be operated from the same set of secondary conductors—i. e., two secondary conductors may supply incandescent lamps, and a third secondary conductor may be added which will coöperate with the first two conductors to supply three-phase currents to three-phase motors, the necessary combination and arrangement being obvious in view of the foregoing illustration and description.

In Fig. 2 the line $a\,b$ represents the electromotive force between the terminals 5 6 of the generator and therefore between the terminals of the line-circuit 7 8, and the line $c\,d$ the electromotive force between the terminals 9 10 of the generator, and consequently between the terminals of the primary 13 of the transformer 14, the relative position of these lines indicating the phase-angle relation between these currents and electromotive forces. The line $d\,e$ represents the electromotive force between the terminals of the secondary 15 of the transformer, and consequently the lines $a\,e$, $a\,b$, and $b\,e$ represent, respectively, the electromotive forces between the line conductors 7 17 and 7 8 and 8 17. The relative angular position of these lines shows that the currents of the three-phase circuit are separated by phase-angles of one hundred and twenty degrees, as is desired in properly-balanced three-phase circuits.

I desire it to be understood that my invention is not limited to specific details of construction of apparatus, and for that reason I have deemed it sufficient to illustrate the several pieces of apparatus embodied in the system diagrammatically.

I claim as my invention—

1. In a system of alternating-current electrical distribution, the combination with a single winding or a plurality of connected windings traversed by out-of-phase currents, of two pairs of leads so connected to said winding or windings as to receive currents in quadrature, two line conductors connected to one pair of said leads, a transformer having its primary connected to the other pair of leads, and a third line conductor connected to one terminal of the transformer-secondary, the transformer-windings being so proportioned that the three line conductors receive three out-of-phase currents of substantially equal electromotive force.

2. In a system of alternating-current electrical distribution, the combination with a generator of two-phase currents, of three line conductors two of which are connected to the generator-terminals corresponding to one phase of current, a transformer having its windings connected to the generator-terminals corresponding to the other phase of current and to the third line conductor, whereby said transformer coöperates with said generator to supply the line conductors with three-phase working currents.

3. A system of alternating-current electrical distribution for single and poly phase translating devices comprising three line conductors, a source of two-phase currents and a transformer connecting one of the line conductors with the other two line conductors through the source of current and so proportioned as to equalize the line electromotive forces and adjust the phase relation thereof.

4. In a system of alternating-current electrical distribution, the combination with a generator of two-phase currents, and two line conductors carrying currents of one phase derived from said generator, of a transformer having its winding connected to the generator and to a third line conductor and so proportioned as to coöperate with said generator in supplying the line conductors with three substantially equal electromotive forces having a proper phase relation.

5. In a system of alternating-current electrical distribution, the combination with a generator having a closed-coil armature-winding, of two line conductors so connected to said winding as to receive a single-phase current therefrom, of a transformer having its primary-winding terminals so connected to the armature-winding as to receive current displaced ninety degrees from the first-named current and having its secondary-winding terminals connected respectively to a third line conductor and to one of the primary terminals, said transformer-windings being so proportioned as to coöperate with the generator in supplying the line conductors with three symmetrically-displaced currents of substantially equal electromotive force.

In testimony whereof I have hereunto subscribed my name this 2d day of November, 1898.

CHAS. F. SCOTT.

Witnesses:
 WESLEY G. CARR,
 H. C. TENER.